(12) United States Patent
Chou et al.

(10) Patent No.: US 12,694,666 B2
(45) Date of Patent: Jul. 28, 2026

(54) METHOD FOR STABILIZING LINE-OF-SIGHT FALLING POINT

(71) Applicant: General Interface Solution Limited, Zhunan Township (TW)

(72) Inventors: Yu-Heng Chou, Miaoli County (TW); Ting-Chun Men, Miaoli County (TW); Chia-Yu Cheng, Miaoli County (TW)

(73) Assignee: General Interface Solution Limited, Miaoli County (TW)

( * ) Notice: Subject to any disclaimer, the term of this patent is extended or adjusted under 35 U.S.C. 154(b) by 489 days.

(21) Appl. No.: 18/082,650

(22) Filed: Dec. 16, 2022

(65) Prior Publication Data

US 2024/0203115 A1      Jun. 20, 2024

(30) Foreign Application Priority Data

Dec. 14, 2022    (CN) .......................... 202211607849.6

(51) Int. Cl.
| | |
|---|---|
| *G06V 10/98* | (2022.01) |
| *G06T 7/73* | (2017.01) |
| *G06V 10/75* | (2022.01) |
| *G06V 40/16* | (2022.01) |
| *G06V 40/18* | (2022.01) |

(52) U.S. Cl.
CPC ............... *G06V 10/98* (2022.01); *G06T 7/73* (2017.01); *G06V 10/751* (2022.01); *G06V 40/171* (2022.01); *G06V 40/193* (2022.01); *G06V 40/197* (2022.01); *G06T 2207/30201* (2013.01)

(58) Field of Classification Search
None
See application file for complete search history.

(56) References Cited

U.S. PATENT DOCUMENTS

| | | | | |
|---|---|---|---|---|
| 2003/0118217 A1* | 6/2003 | Kondo | ................... | G06V 40/19 |
| | | | | 382/209 |
| 2007/0201724 A1* | 8/2007 | Steinberg | ............. | G06V 40/193 |
| | | | | 348/E5.042 |
| 2011/0182497 A1* | 7/2011 | Uliyar | ................. | G06V 40/161 |
| | | | | 382/154 |

(Continued)

FOREIGN PATENT DOCUMENTS

| | | | | | |
|---|---|---|---|---|---|
| CN | 104463081 A | * | 3/2015 | | |
| CN | 103810491 B | * | 2/2017 | | |
| CN | 110490158 A | * | 11/2019 | ............... | G06N 3/08 |

OTHER PUBLICATIONS

S. Sheela and K. R. Radhika, "Feature based Methods for Eye Gaze Tracking," 2020 4th International Conference on Electronics, Communication and Aerospace Technology (ICECA), Coimbatore, India, 2020, pp. 1101-1107, doi: 10.1109/ICECA49313.2020.9297578. (Year: 2020).*

*Primary Examiner* — Amandeep Saini
*Assistant Examiner* — Caroline Tabancay Duffy
(74) *Attorney, Agent, or Firm* — Troutman Pepper Locke LLP; Tim Tingkang Xia, Esq.

(57) ABSTRACT

Disclosed is a line-of-sight detection method, including a step SA1 and a step SA2. The step SA1 performs a dynamic-threshold-to-switch action to correct the error of the data generated in the previous facial feature detection step. Furthermore, the step SA2 performs an eye-ROI-filtering action serving as a pretreatment step to filter a plurality of eye-ROI images and establish a sample set.

4 Claims, 16 Drawing Sheets

(56) References Cited

U.S. PATENT DOCUMENTS

| | | | |
|---|---|---|---|
| 2015/0309569 A1* | 10/2015 | Kohlhoff | G06V 40/193 |
| | | | 382/103 |
| 2016/0105665 A1* | 4/2016 | Wang | G02B 27/0093 |
| | | | 348/55 |
| 2016/0202756 A1* | 7/2016 | Wu | G06F 3/0304 |
| | | | 382/103 |
| 2017/0286771 A1* | 10/2017 | Ishii | A61B 3/113 |
| 2021/0049760 A1* | 2/2021 | Yan | G06V 40/171 |
| 2022/0286741 A1* | 9/2022 | Epari | G06F 3/167 |
| 2022/0309780 A1* | 9/2022 | Chen | G06V 40/168 |

* cited by examiner dynamic threshold to switch

Angle_1 ⟶ key points 1

Angle_2 ⟶ key points 2

Angle_3 ⟶ key points 3

SA1

Fig. 2 o  ground truth          ● predict without image perspective transformation normalization with image perspective transformation normalization without image perspective
transformation normalization with image perspective
transformation normalization without image perspective
transformation normalization with image perspective
transformation normalization without image perspective
transformation normalization with image perspective
transformation normalization

METHOD FOR STABILIZING LINE-OF-SIGHT FALLING POINT

CROSS-REFERENCE TO RELATED APPLICATIONS

This application claim priority to Chinese application Numbered 202211607849.6, filed Dec. 14, 2022, which is herein incorporated by reference in its' integrity.

BACKGROUND OF THE INVENTION

Field of the Invention

The present disclosure relates to an algorithm, in particular to a line-of-sight detection method.

Description of the Related Art

Conventional long-distance line-of-sight detection technology is widely utilized for screen control and public field applications. Non-contact (i.e. non-head-mounted) eye tracking is a method of capturing real-time streaming images through a camera as an input source, outputting the coordinates of the user's gaze point through an eye tracking algorithm and matching the user's behavior with a remote display. Interaction behavior includes controlling and monitoring of the human-machine interface or the interaction of information and entertainment, and even the implicit analysis of the region of interest that the user gazes at. The algorithm under the non-contact eye-tracking human-computer interface interaction method needs to consider more user information, so the algorithm needs to include face detection, face feature point detection, head swing calculation, pupil detection and gaze point estimation. Specifically, the aforementioned face feature point detection is mainly used to perform head posture estimation and human eye positioning.

However, the stability of long-distance line-of-sight detection has always been a problem to be overcome as errors easily occurs in the long-distance line-of-sight point detection that are mainly resulted from human factors such as different users who cause errors during the detection of facial feature points. The sources of errors in facial feature point detection are resulted from, for example, that (1) the error distribution of different points causes improper calculation of the head swing and the source of the error; and that (2) the failure of the positioning of the human eye area causes pupil detection errors, which eventually lead to loss of sight a bit unstable.

Therefore, providing a line-of-sight detection method that can solve the above-mentioned problems is an important issue in this technical field.

SUMMARY OF THE INVENTION

In view of this, the purpose of the disclosed invention is to improve the line-of-sight point detection stability of the line-of-sight detection method. Disclosed is an exemplary line-of-sight detection method, including a step SA1 and a step SA2. The step SA1 performs a dynamic-threshold-to-switch action to correct errors of data generated in a previous facial landmark detection step. Furthermore, the step SA2 performs an eye-ROI-filtering action serving as a pretreatment step to filter a plurality of eye-ROI images and establish a sample set.

In another embodiment, the step SA1 shows that a dynamic threshold value serves as criteria for calculating a reference point of a head posture feature when the reference point switches.

In another embodiment, the step SA1 is performed by calculating the normalized root mean square error (abbreviated NRMSE) based on a scene image collected, employing the NRMSE less than a first threshold value as a basis for image grouping, calculating a standard deviation of multiple facial features based on images of each group, and selecting points of the facial features having a standard deviation less than a second threshold value so as to set a dynamic threshold value.

In another embodiment the step SA2 is a pre-process for an image size and a pupil feature image, thereby making a difference between positive and negative samples and then providing an optimized discrimination effect.

In another embodiment, the step SA2 is performed using a single template matching coefficient less than a third threshold value as criteria for determining a filter.

In another embodiment, the step SA1 is performed by extracting key points corresponding to different angles.

In another embodiment, the step SA1 is capable of reducing improper calculation of head swing caused by an error distribution of different points of the facial features; and wherein the step SA2 is capable of filtering out pupil detection errors resulted from human eye area positioning failure of different points of the facial features, thereby improving stability of line-of-sight detection.

Disclosed herein is another exemplary line-of-sight detection method, comprising: a step S1, detecting a face; a step S2, detecting a facial landmark; a step SA1 that executes a dynamic-threshold-to-switch action; a step S3, estimating a head pose; a step S4, detecting a pupil; and a step S5, estimating a gaze.

In another embodiment, the step SA1 shows that a dynamic threshold value serves as criteria for calculating a reference point of a head posture feature when the reference point switches.

In another embodiment, the step SA1 is performed by calculating the normalized root mean square error (abbreviated NRMSE) based on a scene image collected, employing the NRMSE less than a first threshold value as a basis for image grouping, calculating a standard deviation of multiple facial features based on images of each group, and selecting points of the facial features having standard a deviation less than a second threshold value so as to set a dynamic threshold value.

In another embodiment, the step SA2 is a pre-process for an image size and a pupil feature image, thereby making a difference between positive and negative samples and then providing an optimized discrimination effect.

In another embodiment, the step SA2 is performed using a single template matching coefficient less than a third threshold value as criteria for determining a filter.

In another embodiment, the step SA1 is performed by extracting key points corresponding to different angles.

In another embodiment, the step SA1 is capable of reducing improper calculation of head swing caused by an error distribution of different points of the facial features; and wherein the step SA2 is capable of filtering out pupil detection errors resulted from human eye area positioning failure of different points of the facial features, thereby improving stability of line-of-sight detection.

Disclosed herein is another exemplary line-of-sight detection method, comprising: a step S1 that performs a face detection; a step S2 that performs a facial landmark detection; a step SA1 that performs a dynamic-threshold-to-switch action; a step S3 that performs a head pose estimation; a step SA2 that performs an eye-ROI-filtering action; a step S4 that performs a pupil detection; and a step S5 that performs a gaze estimation.

In another embodiment, the step SA1 shows that a dynamic threshold value serves as criteria for calculating a reference point of a head posture feature when the reference point switches.

In another embodiment, the step SA1 is performed by calculating the normalized root mean square error (abbreviated NRMSE) based on a scene image collected, employing the NRMSE less than a first threshold value as a basis for image grouping, calculating a standard deviation of multiple facial features based on images of each group, and selecting points of the facial features having a standard deviation less than a second threshold value so as to set a dynamic threshold value.

In another embodiment, the step SA2 is a pre-process for an image size and a pupil feature image, thereby making a difference between positive and negative samples and then providing an optimized discrimination effect.

In another embodiment, the step SA2 is performed using a single template matching coefficient less than a third threshold value as criteria for determining a filter.

In another embodiment, the step SA1 is capable of reducing improper calculation of head swing caused by an error distribution of different points of the facial features; and wherein the step SA2 is capable of filtering out pupil detection errors resulted from human eye area positioning failure of different points of the facial features, thereby improving stability of line-of-sight detection.

BRIEF DESCRIPTION OF THE DRAWINGS

FIG. 2 illustrates specific steps of the line-of-sight detection method shown in FIG. 1.

4

FIG. 12A to FIG. 12E illustrate the effect of image processing using step SA2 in an embodiment of the present disclosure.

DESCRIPTION OF THE PREFERRED EMBODIMENTS

First of all, it should be noted that the phrase "step SA1" appears in the disclosure refers to a step performing a dynamic-threshold-to-switch action to correct errors of data generated in a previous facial landmark detection step. Also, the phrase "step SA2" appears in the disclosure refers to a step that performs an eye-ROI-filtering action serving as a pretreatment step to filter a plurality of eye-ROI images and establish a sample set. In embodiments of the present disclosure, the step SA1 and the step SA2, standing alone or in combination, are helpful to improve the stability of line-of-sight point detection.

Figure 1:
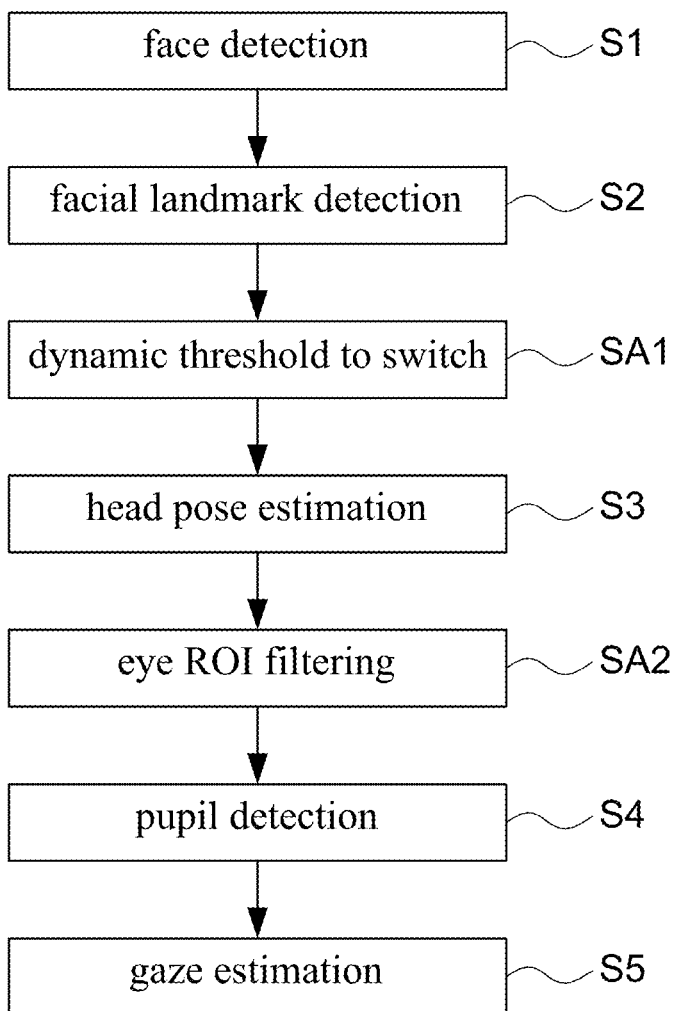
FIG. 1 is a flowchart showing a line-of-sight detection method in accordance with an embodiment of the present disclosure.
Figure 2:
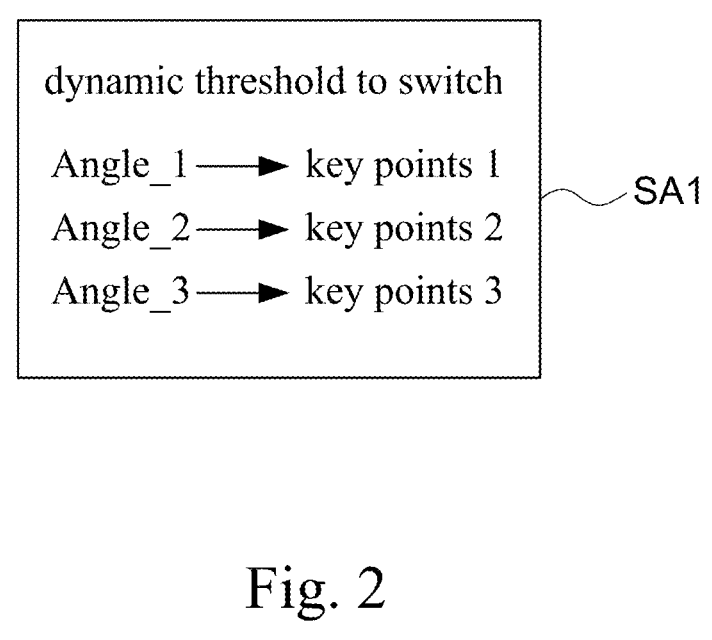
Figure 3:
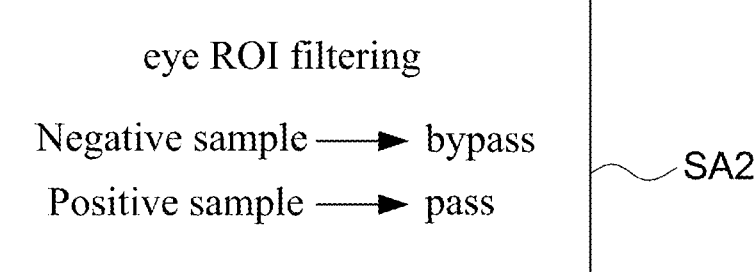
FIG. 3 illustrates specific steps of the line-of-sight detection method shown in FIG. 1.

Referring to FIG. 1 to FIG. 3, FIG. 1 is a flowchart showing a line-of-sight detection method in accordance with an embodiment of the present disclosure. FIG. 2 illustrates specific steps of the line-of-sight detection method shown in FIG. 1. FIG. 3 illustrates specific steps of the line-of-sight detection method shown in FIG. 1. As shown in FIG. 1 to FIG. 3, one embodiment of the present disclosure shows an exemplary line-of-sight detection method including a step SA1 and a step SA2. The step SA1 performs a dynamic-threshold-to-switch action to correct the error of the data generated in the previous facial landmark detection step. Furthermore, the step SA2 performs an eye-ROI-filtering action serving as a pretreatment step to filter a plurality of eye-ROI images and establish a sample set.

As shown in FIG. 1, another exemplary line-of-sight detection method disclosed not only includes the step SA1 and the step SA2, but includes a step S1 performing a face detection, a step S2 performing a facial landmark detection, a step S3 performing a head pose estimation, a step S4 performing a pupil detection, and a step S5 performing a gaze estimation. The following examples will be described in more detail.

As shown in FIG. 2, when the step SA1 is performed, extracting key points corresponding to different angles is made. For example, key points 1 correspond to angle_1, key points 2 correspond to angle 2, and key points 3 correspond to angle_3. Additionally, in the step SA1, a dynamic threshold value serves as criteria for calculating a reference point of a head posture feature when the reference point switches. Furthermore, one embodiment of the present disclosure shows that the step SA1 is performed by calculating the normalized root mean square error (abbreviated NRMSE) based on a scene image collected, employing the NRMSE less than a first threshold value (e.g., 0.03) as a basis for image grouping, calculating a standard deviation of multiple facial features based on images of each group, and selecting points of the facial features having a standard deviation less than a second threshold value (e.g., 0.01) so as to set a dynamic threshold value.

Figure 10:
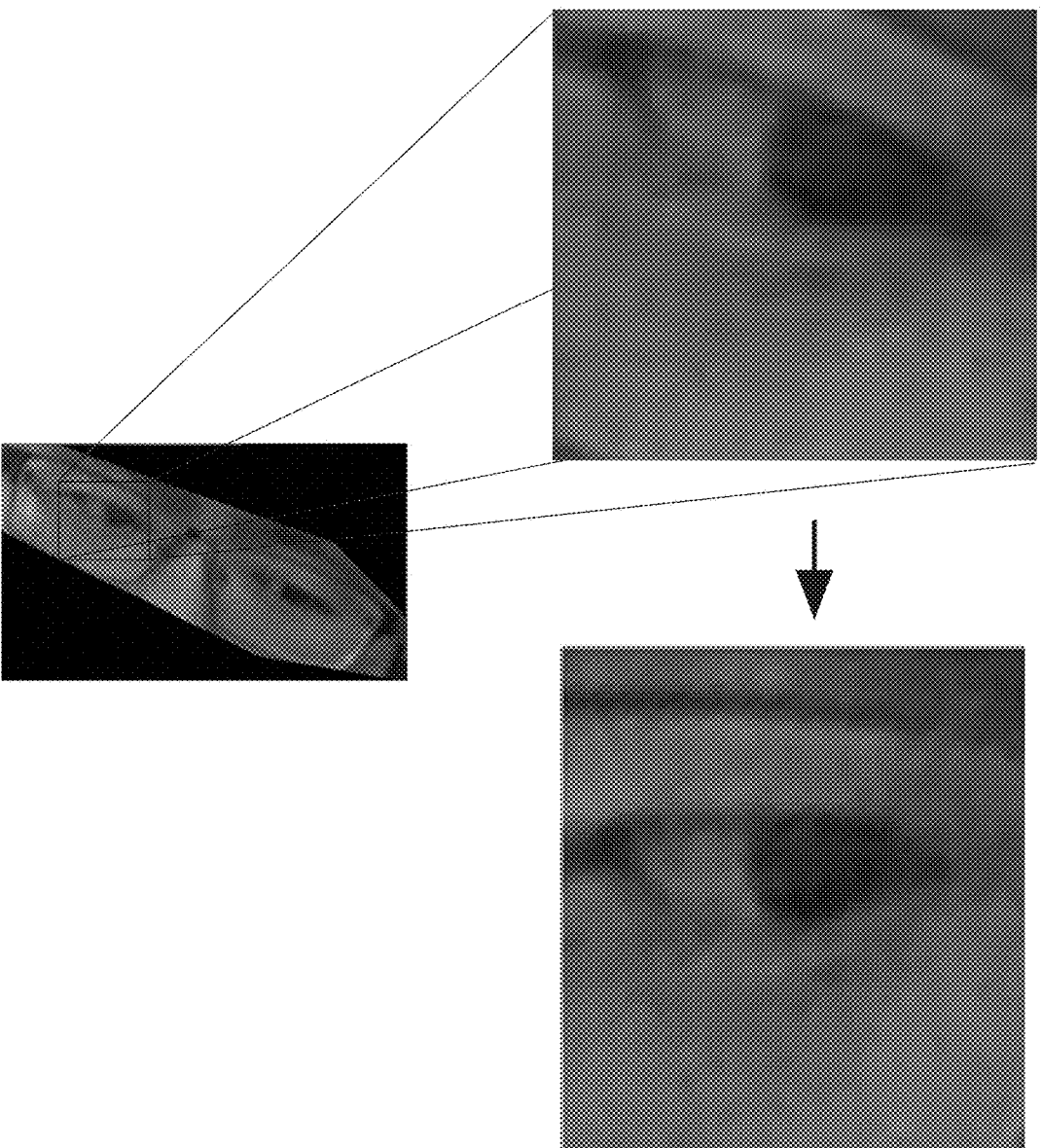
FIG. 10 illustrates the difference between normalized and non-normalized images using image perspective transformation in accordance with an embodiment of the present disclosure.

Continuing to refer to FIG. 3, when the step SA2 performs an eye-ROI-filtering action, it executes (or conducts) a pre-process for an image size and a pupil feature image, thereby making a difference between positive and negative samples and then providing an optimized discrimination effect. Furthermore, one embodiment of the present disclosure shows that, when performing the eye ROI filtering action in the step SA2, it is necessary to perform affine transformation to positively convert the target image and maintain the size as well as the direction to fit the template pattern, and further increase the difference between positive and negative samples through pupil feature enhancement processing, thereby optimizing the discrimination effect. Additionally, in one embodiment of the present disclosure, the step SA2 is performed using a single template matching coefficient less than a third threshold value (e.g., 0.6) as criteria for determining a filter. Furthermore, in one embodiment of the present disclosure, the collected images are from 400 different people and the collected images have no internal parameters of the shooting camera, so the general image size is normalized, and the pupil image is emphasized by using the Haar features to reduce the impact of color differences, and use a single template matching coefficient less than a predetermined value (e.g., 0.6) as a criterion for the filter. Continuing to refer to FIG. 10, it illustrates the difference between normalized and non-normalized images using image perspective transformation in accordance with an embodiment of the present disclosure.

Specifically, embodiments of the present disclosure show that the step SA1 is capable of reducing improper calculation of head swing caused by an error distribution of different points of the facial features. The step SA2 is capable of filtering out pupil detection errors resulted from human eye area positioning failure of different points of the facial features, thereby improving stability of line-of-sight detection.

Figure 4:
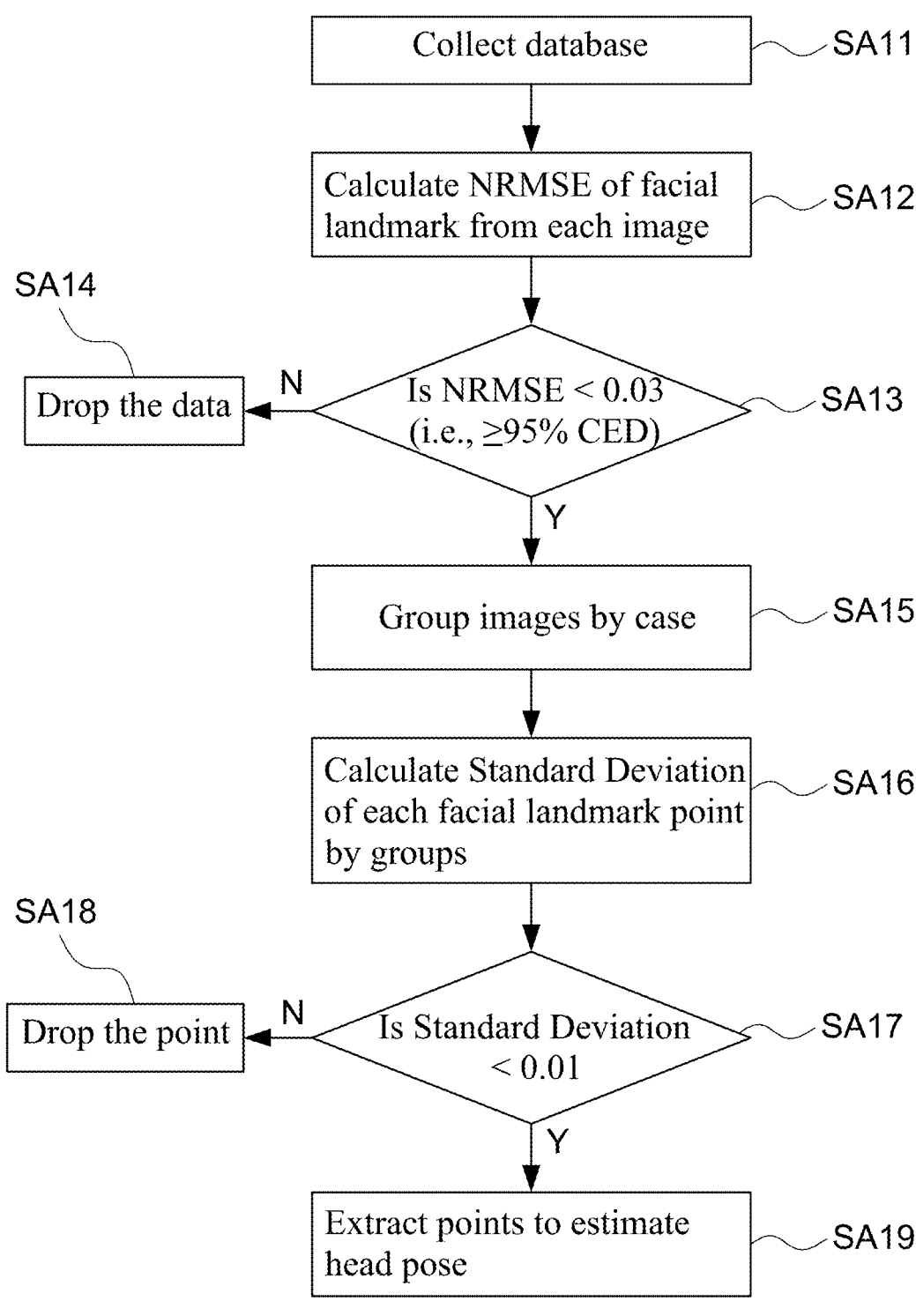
FIG. 4 illustrates a sub-flow of specific steps for the line-of-sight detection method of FIG. 1.
Figure 5:
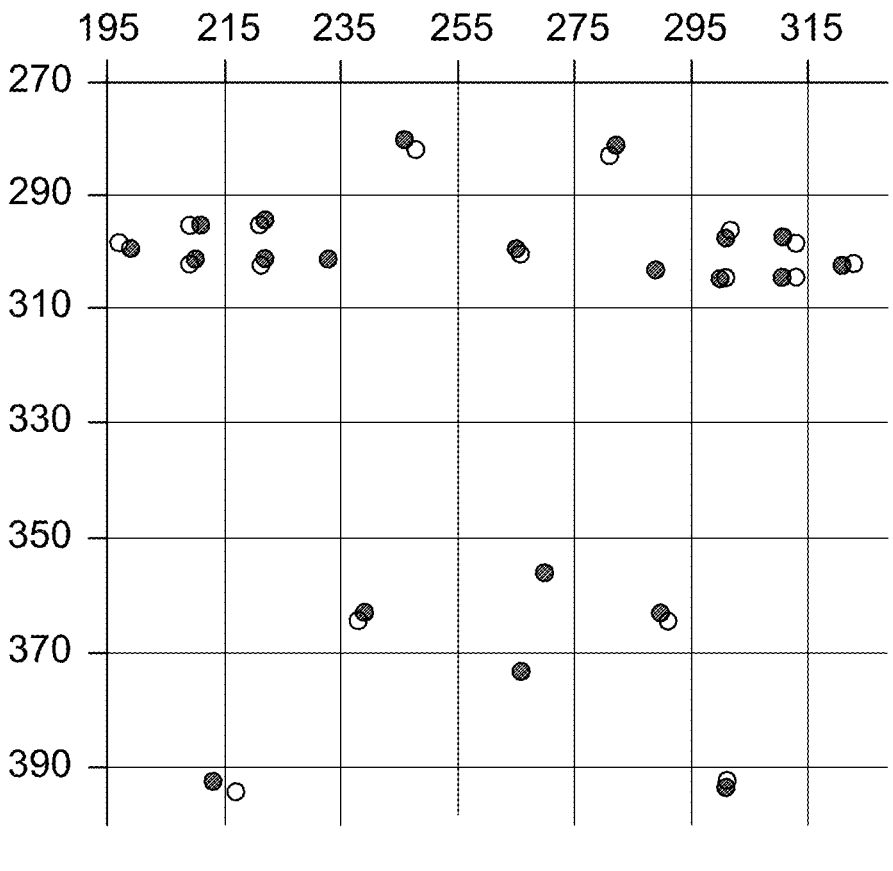
FIG. 5 illustrates the relationship between NRMSE and facial feature points for the line-of-sight detection method in accordance with an embodiment of the present disclosure.
Figure 6:
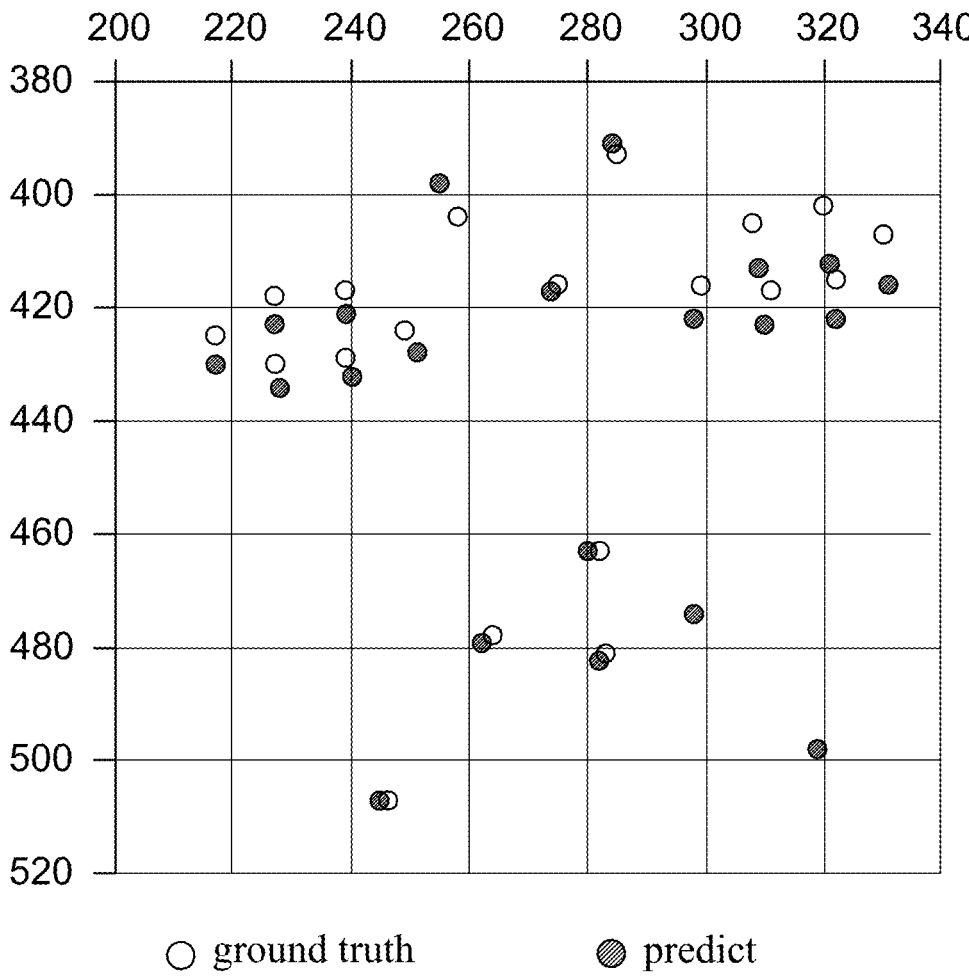
FIG. 6 illustrates the relationship between NRMSE and facial feature points for the line-of-sight detection method in accordance with an embodiment of the present disclosure.
Figure 7:
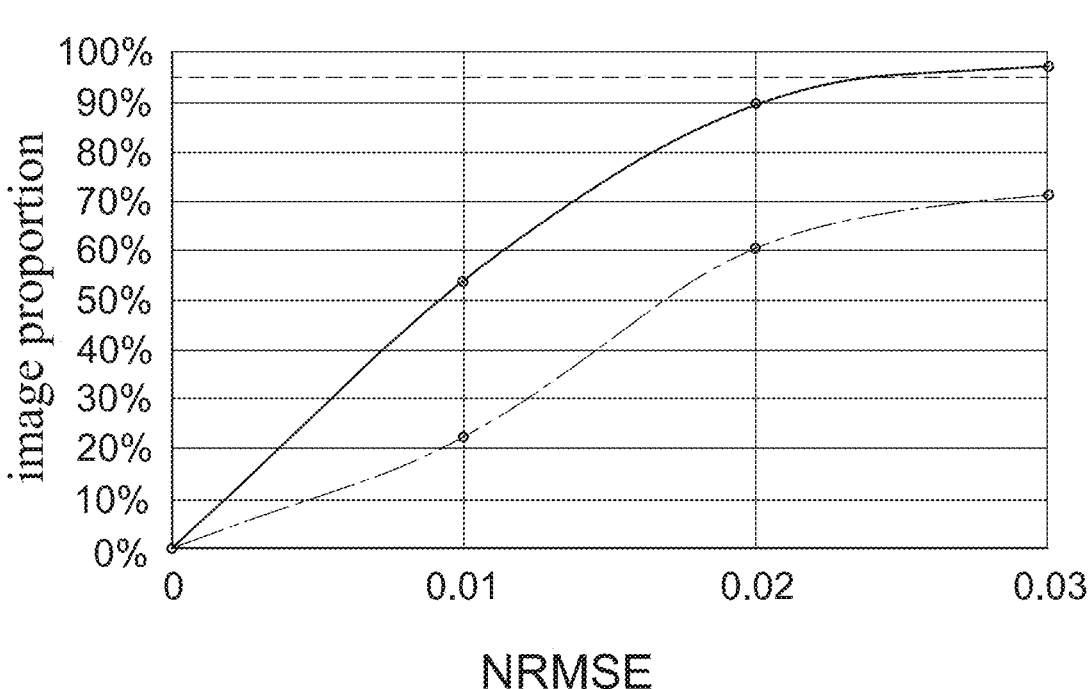
FIG. 7 illustrates the relationship between NRMSE and image scale for the line-of-sight detection method in accordance with an embodiment of the present disclosure.
Figure 8:
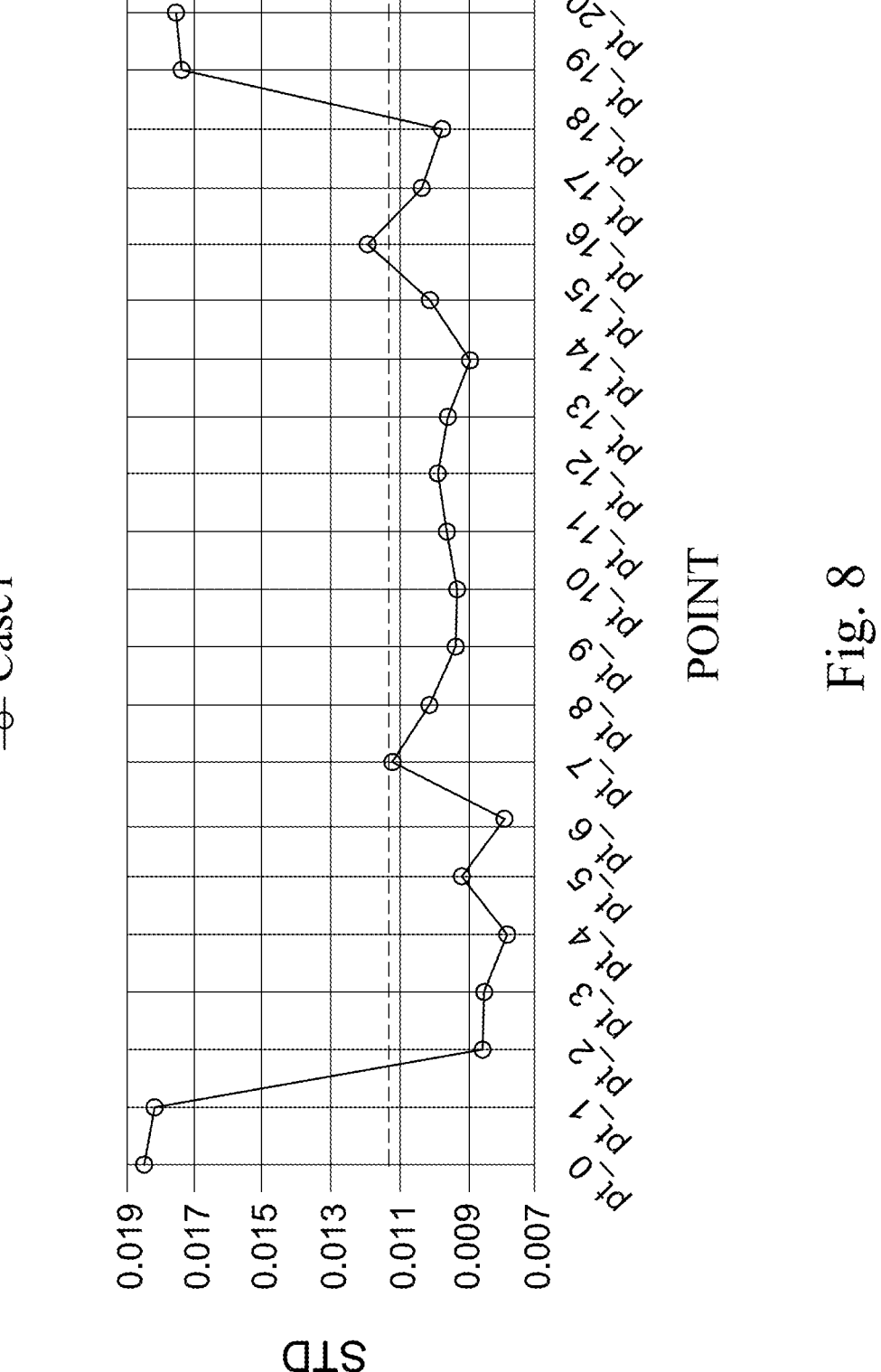
FIG. 8 illustrates the relationship between face image samples and standard deviations of respective points for the line-of-sight detection method in accordance with an embodiment of the present disclosure.

Continuing to refer to embodiments of FIG. 4 to FIG. 8, FIG. 4 illustrates a sub-flow of specific steps for the line-of-sight detection method of FIG. 1. FIG. 5 illustrates the relationship between NRMSE and facial feature points for the line-of-sight detection method in accordance with an embodiment of the present disclosure. FIG. 6 illustrates the relationship between NRMSE and facial feature points for the line-of-sight detection method in accordance with an embodiment of the present disclosure. FIG. 7 illustrates the relationship between NRMSE and image scale for the line-of-sight detection method in accordance with an embodiment of the present disclosure. FIG. 8 illustrates the relationship between face image samples and standard deviations of respective points for the line-of-sight detection method in accordance with an embodiment of the present disclosure.

As shown in FIG. 4, the sub-flow of step SA1, which includes steps SA11 to SA19, is further described as follows:

In the step SA11, collecting the database is executed.

In the step SA12, calculating NRMSE values of the facial features for each image is executed.

In the step SA13, determining whether the NRMSE value is less than 0.03 (i.e., selecting an available facial feature algorithm with CED≥95%) is executed.

In the step SA14, discarding the data (i.e., dropping the data) is executed.

In the step SA15, grouping the images according to the test object (i.e., grouping images by case) is executed.

In the step SA16, calculating a standard deviation of each facial landmark (or facial feature) point by groups is executed.

In the step SA17, determining whether the standard deviation is less than 0.01 is executed.

In the step SA18, discarding the point (i.e., dropping the point) is executed.

In the step SA19, extracting points to estimate head pose is executed.

As shown in FIG. 5, when the NRMSE value equals 0.01, the accuracy of each facial feature point in the face image sample is basically quite high, complying with a screening standard (e.g., the NRMSE value is less than 0.03).

As shown in FIG. 6, when the NRMSE value equals 0.04, the accuracy of each facial feature point in the face image sample is relatively lower than that of the sample in FIG. 5, and does not reach the screening standard, for example, the NRMSE value is not less than 0.03.

Therefore, it is realized from FIG. 5 and FIG. 6 that the smaller the NRMSE value, the higher the accuracy of each facial feature point in the face image sample.

As shown in FIG. 7 depicting a cumulative error distribution diagram, it is realized that the larger the slope of the distribution curve, the larger the proportion of images with small errors, that is, the higher the versatility of the facial feature algorithm.

In addition, FIG. 8 shows that the standard deviations of face image samples with facial features having NRMSE less than 0.03 for their respective points can be realized.

Figure 9:
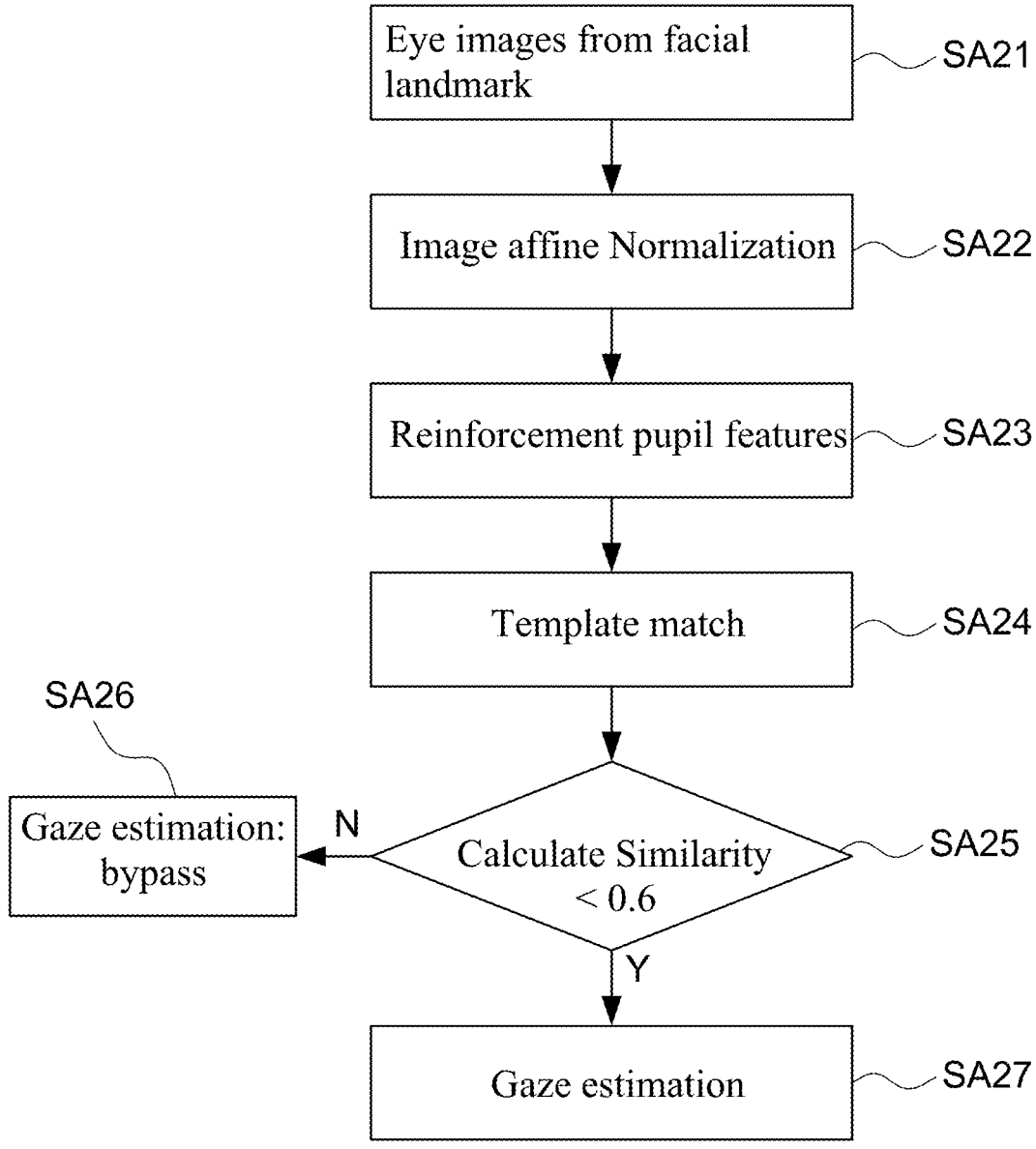
FIG. 9 illustrates a sub-flow of specific steps for the line-of-sight detection method of FIG. 1.
Figure 11:
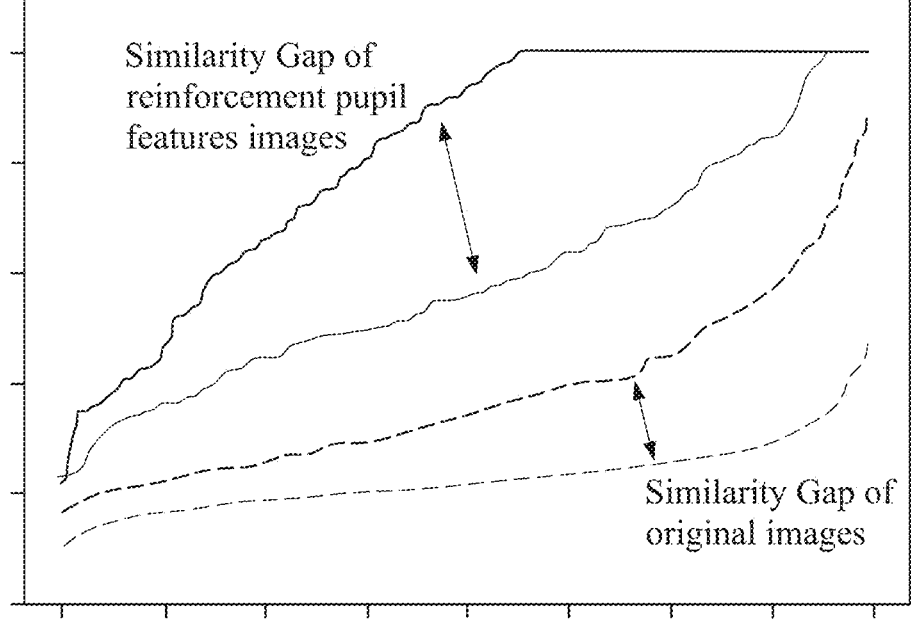
FIG. 11 illustrates the difference in similarity between pupil feature images after enhancement for the line-of-sight detection method in accordance with an embodiment of the present disclosure.

Continuing to refer to FIG. 9 and FIG. 11, FIG. 9 illustrates a sub-flow of specific steps for the line-of-sight detection method of FIG. 1. FIG. 11 illustrates the difference in similarity between pupil feature images after enhancement for the line-of-sight detection method in accordance with an embodiment of the present disclosure.

As shown in FIG. 9, the sub-flow of step SA2, which includes steps SA21 to SA27, is further described as follows:

In the step SA21, extracting eye images from the facial landmark (or facial features) is conducted (or performed).

In the step SA22, an image perspective transformation normalization is conducted.

In the step SA23, an action of reinforcing (or strengthening) pupil features is conducted.

In the step SA24, a template matching action is conducted.

In the step SA25, calculating and finding out samples with similarity less than 0.6 is conducted.

In the step SA26, the line-of-sight estimation is not performed, that is, some samples are determined to be skipped (i.e., bypass).

In the step SA27, an action of gaze estimation is conducted.

Additionally, another aspect of the present disclosure provides a line-of-sight detection method. The method includes a step S1 performing face detection, a step S2 performing facial landmark detection, a step SA1 performing a dynamic-threshold-to-switch action, a step S3 performing a head pose estimation, a step S4 performing a pupil detection, and a step S5 performing a gaze estimation.

In one embodiment of the present disclosure, the step SA1 utilizes a dynamic threshold as a basis for switching a reference point for calculating a head posture feature. In one embodiment of the present disclosure, the step SA1 is performed by calculating the normalized root mean square error (abbreviated NRMSE) based on a scene image collected, employing the NRMSE less than a first threshold value (e.g., 0.03) as a basis for image grouping, calculating a standard deviation of multiple facial features based on images of each group, and selecting points of the facial features having a standard deviation less than a second threshold value (e.g., 0.01) so as to set a dynamic threshold value.

Alternatively, another aspect of the present disclosure provides a line-of-sight detection method. The method includes a step S1 performing face detection, a step S2 performing facial landmark detection, a step SA1 performing a dynamic-threshold-to-switch action, a step S3 performing a head pose estimation, a step SA2 performing an eye-ROI-filtering action, a step S4 performing a pupil detection, and a step S5 performing a gaze estimation.

In one embodiment of the present disclosure, the step SA1 utilizes a dynamic threshold as a basis for switching a reference point for calculating a head posture feature. In one embodiment of the present disclosure, the step SA1 is performed by calculating the normalized root mean square error (abbreviated NRMSE) based on a scene image collected, employing the NRMSE less than a first threshold value (e.g., 0.03) as a basis for image grouping, calculating a standard deviation of multiple facial features based on images of each group, and selecting points of the facial features having a standard deviation less than a second threshold value (e.g., 0.01) so as to set a dynamic threshold value.

In one embodiment of the present disclosure, the step SA1 is, for example, used to extract key points corresponding to different angles. In one embodiment of the present disclosure, the step SA1 is capable of reducing improper calculation of head swing caused by an error distribution of different points of the facial features. In addition, the step SA2 is capable of filtering out pupil detection errors resulted from human eye area positioning failure of different points of the facial features, thereby improving stability of line-of-sight detection.

In one embodiment of the present disclosure, when the step SA2 performs an eye-ROI-filtering action, it executes (or conducts) a pre-process for an image size and a pupil feature image, thereby making a difference between positive and negative samples and then providing an optimized discrimination effect. In details, one embodiment of the present disclosure shows that, when performing the eye ROI filtering action in the step SA2, it is necessary to perform affine transformation to positively convert the target image and maintain the size as well as the direction to fit the template pattern, and further increase the difference between positive and negative samples through pupil feature enhancement processing, thereby optimizing the discrimination effect. Additionally, in one embodiment of the present disclosure, the step SA2 is performed using a single template matching coefficient less than a third threshold value (e.g., 0.6) as criteria for determining a filter. Furthermore, in one embodiment of the present disclosure, the collected images are from 400 different people and the collected images have no internal parameters of the shooting camera, so the general image size is normalized, and the pupil image is emphasized by using the Haar features to reduce the impact of color differences, and use a single template matching coefficient less than a predetermined value (e.g., 0.6) as a criterion for the filter. Continuing to refer to FIG. 11, it illustrates the difference in similarity between pupil feature images after enhancement for the line-of-sight detection method in accordance with an embodiment of the present disclosure.

As shown in FIG. 11, the first and third curves from top to bottom represent negative samples (i.e., no complete eye image), while the second and fourth curves from top to bottom represent positive samples (i.e., with full eye image). Furthermore, FIG. 11 depicts that the similarity gap between the enhanced pupil feature images and the similarity gap between the original images. Specifically, the third and fourth curves from top to bottom are the similarity differences calculated without pupil enhancement processing, while the first and second curves from top to bottom are the similarity differences after pupil enhancement processing. It is realized that, from the first and second curves from top to bottom, the difference in similarity coefficient between positive and negative samples increases due to the increased processing of pupils.

Figure 12A:
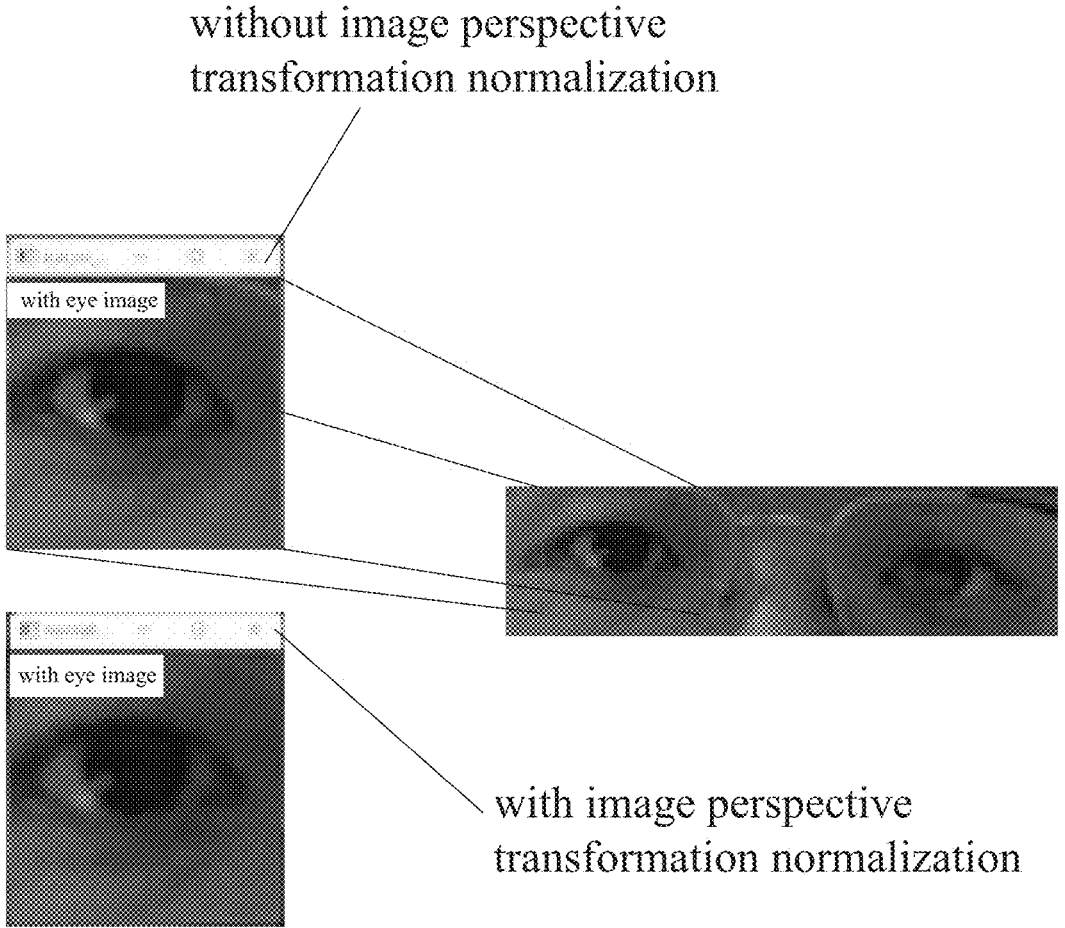
Figure 12B:
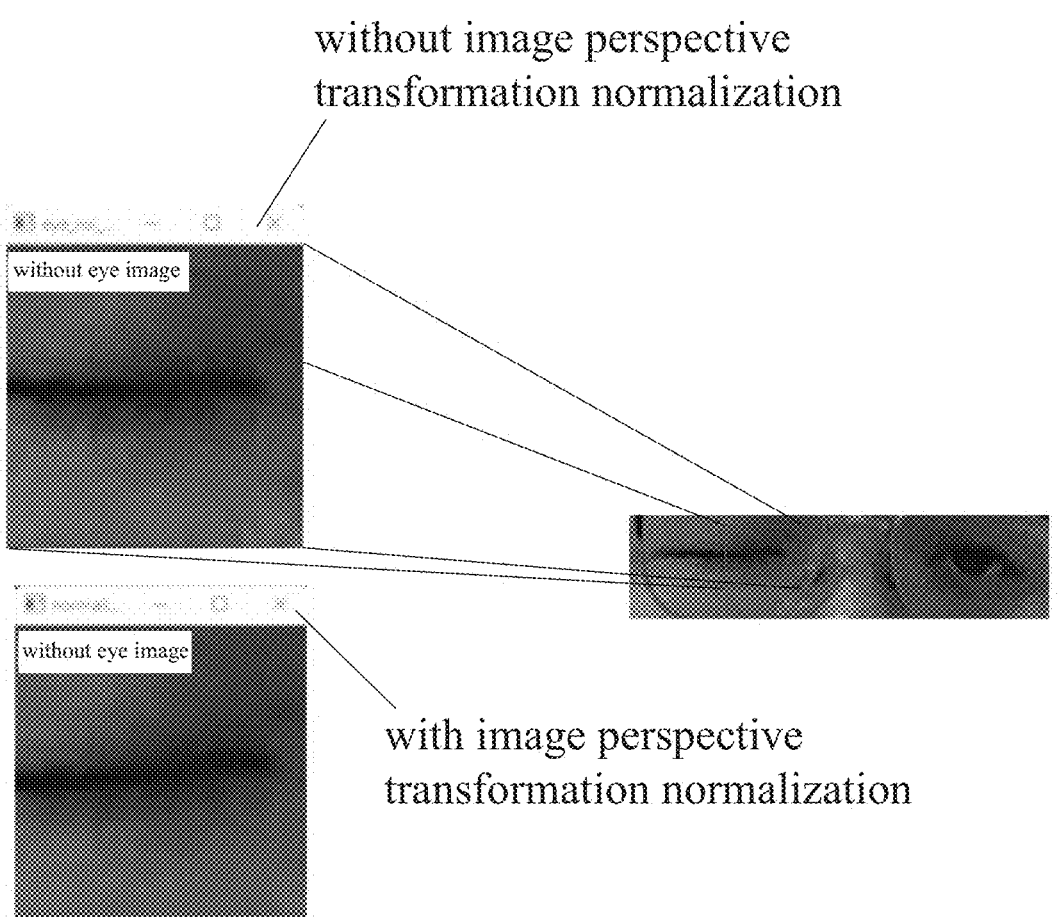
Figure 12C:
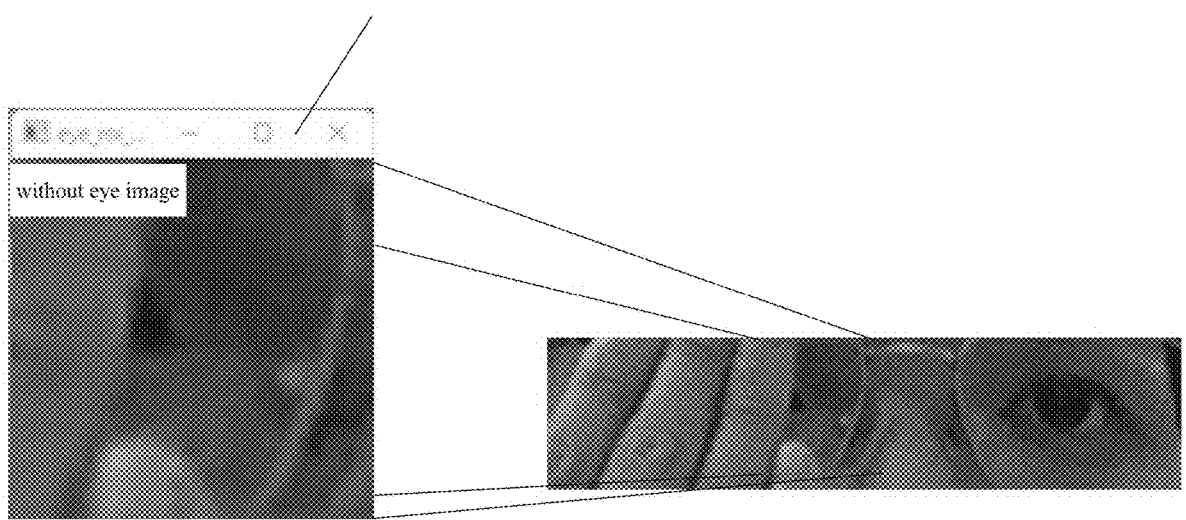
Figure 12C:
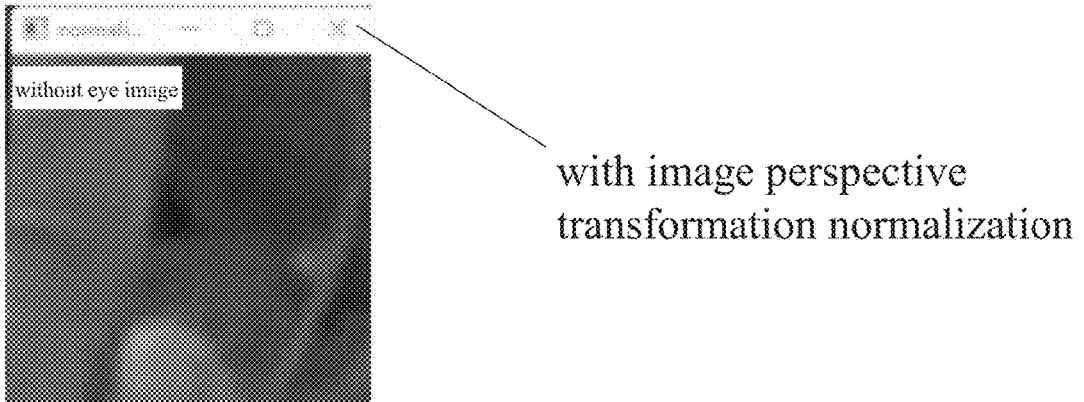
Figure 12D:
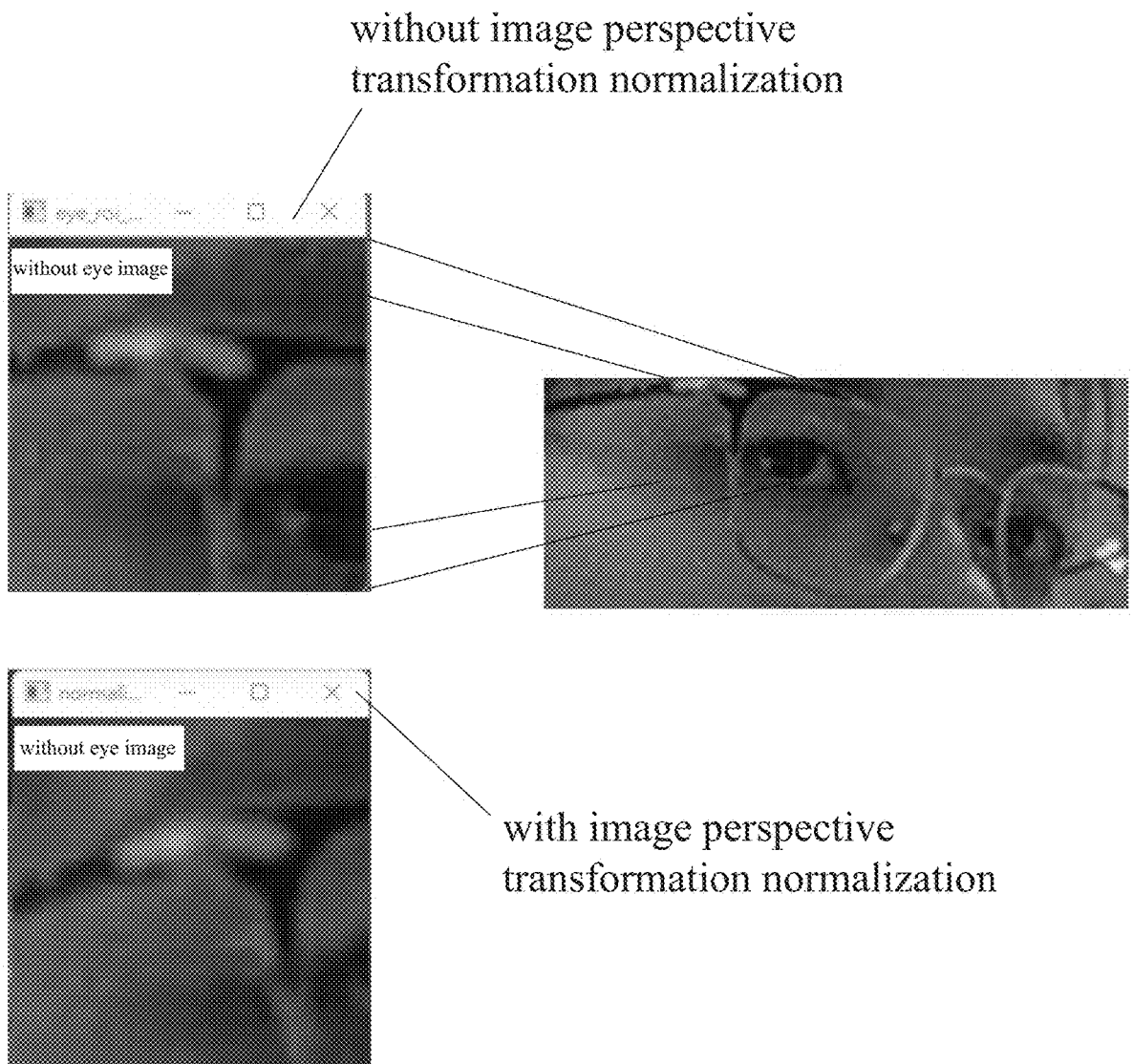
Figure 12E:
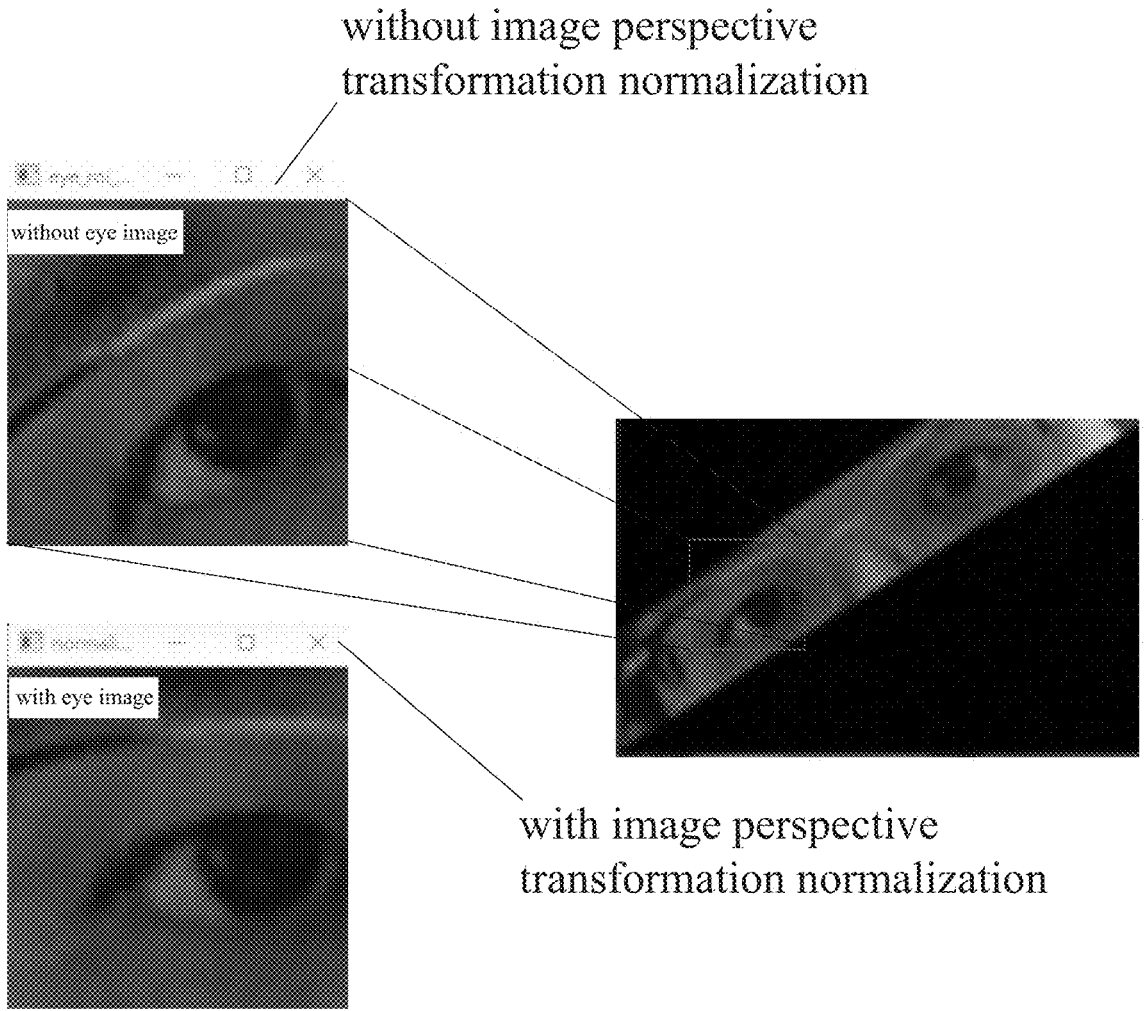

Continuing to refer to FIG. 12A to FIG. 12E, FIG. 12A to FIG. 12E illustrate the effect of image processing using step SA2 in an embodiment of the present disclosure. Specifically, as shown in FIG. 12, the embodiment of the present disclosure employs the step SA2 to skip eye blinks and incorrect images and make single template detection more suitable for deflection situations through transmission conversion. Furthermore, FIG. 12A shows the case of normally captured image; FIG. 12B shows the case of blinking image; FIG. 12C shows the case of occluded image; FIG. 12D shows the case of incorrectly positioned images; FIG. 12E illustrates the comparison results of samples without and after perspective transformation calculations. Such results show that image are deflected without perspective transformation calculation, while the image is straightened after the calculation of perspective transformation. That is, it is better to adapt to a single template after perspective transformation calculation.

While this invention has been described with respect to at least one embodiment, the invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A line-of-sight detection method, executed by a computer processor, including:

a step SA1 that performs a dynamic-threshold-to-switch action to correct errors of data generated in a previous facial landmark detection step, the step SA1 comprising calculating normalized root mean square error (abbreviated NRMSE) based on a scene image collected, employing the NRMSE less than a first threshold value as a basis for image grouping, calculating a standard deviation of multiple facial features based on images of each group, and selecting points of the facial features having a standard deviation less than a second threshold value, so as to set a dynamic threshold value, wherein the dynamic threshold value serves as criteria for calculating a reference point of a head posture feature when the reference point switches; and a step SA2 that performs an eye-ROI-filtering action serving as a pretreatment step to filter a plurality of eye-ROI images and establish a sample set, comprising: extracting the plurality of eye-ROI images from a facial landmark generated in the previous facial landmark detection step; emphasizing a pupil image of the plurality of eye-ROI images by using Haar features, so as to improve difference between a positive sample and a negative sample; conducting a template matching for the plurality of eye-ROI images; calculating a similarity of each of the plurality of eye-ROI images, wherein the sample set comprises eye-ROI images having a similarity greater than or equal to a third threshold value, and eye-ROI images having a similarity less than the third threshold value are bypassed from subsequent gaze estimation processing.

2. The line-of-sight detection method of claim 1, wherein the step SA1 is performed by extracting key points corresponding to different angles of a head.

3. A line-of-sight detection method, executed by a computer processor, comprising:

a step S1, detecting a face;

a step S2, detecting a facial landmark;

a step SA1, executing a dynamic-threshold-to-switch action, comprising calculating normalized root mean square error (abbreviated NRMSE) based on a scene image collected, employing the NRMSE less than a first threshold value as a basis for image grouping, calculating a standard deviation of multiple facial features based on images of each group, and selecting points of the facial features having standard a deviation less than a second threshold value, so as to set a dynamic threshold value, wherein the dynamic threshold value serves as criteria for calculating a reference point of a head posture feature when the reference point switches;

a step SA2, performing an eye-ROI-filtering action serving as a pretreatment step to filter a plurality of eye-ROI images and establish a sample set, comprising: extracting the plurality of eye-ROI images from a facial landmark generated in the previous facial landmark detection step; emphasizing a pupil image of the plurality of eye-ROI images by using Haar features, so as to improve difference between a positive sample and a negative sample; conducting a template matching for the plurality of eye-ROI images; calculating a similarity of each of the plurality of eye-ROI images, wherein the sample set comprises eye-ROI images having a similarity greater than or equal to a third threshold value, and eye-ROI images having a similarity less than the third threshold value are bypassed from subsequent gaze estimation processing;

a step S3, estimating a head pose;

a step S4, detecting a pupil; and a step S5, estimating a gaze.

4. The line-of-sight detection method of claim 3, wherein the step SA1 is performed by extracting key points corresponding to different angles of a head.

* * * * *